June 5, 1962  W. T. RENTSCHLER  3,037,437
PHOTOGRAPHIC CAMERA HAVING AUTOMATIC EXPOSURE SETTING MEANS
Filed April 24, 1961  3 Sheets-Sheet 3
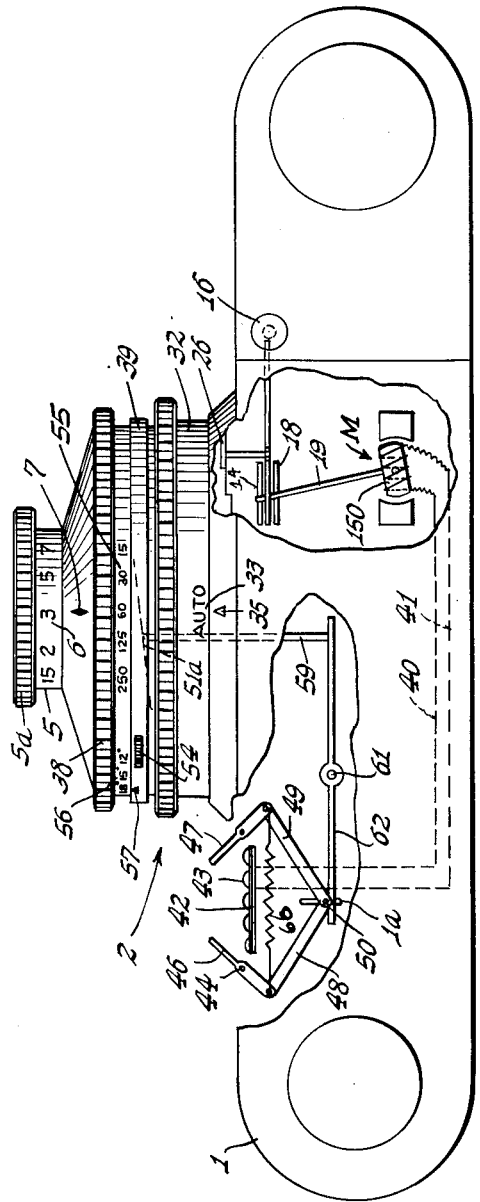
INVENTOR.
Waldemar T. Rentschler
BY
March and Curtiss
ATTORNEYS

# United States Patent Office 3,037,437
Patented June 5, 1962

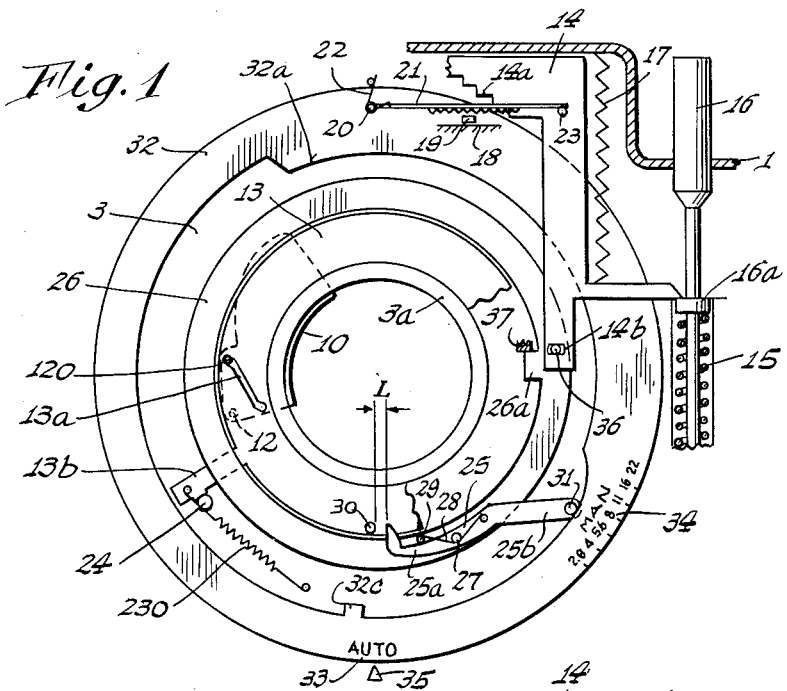
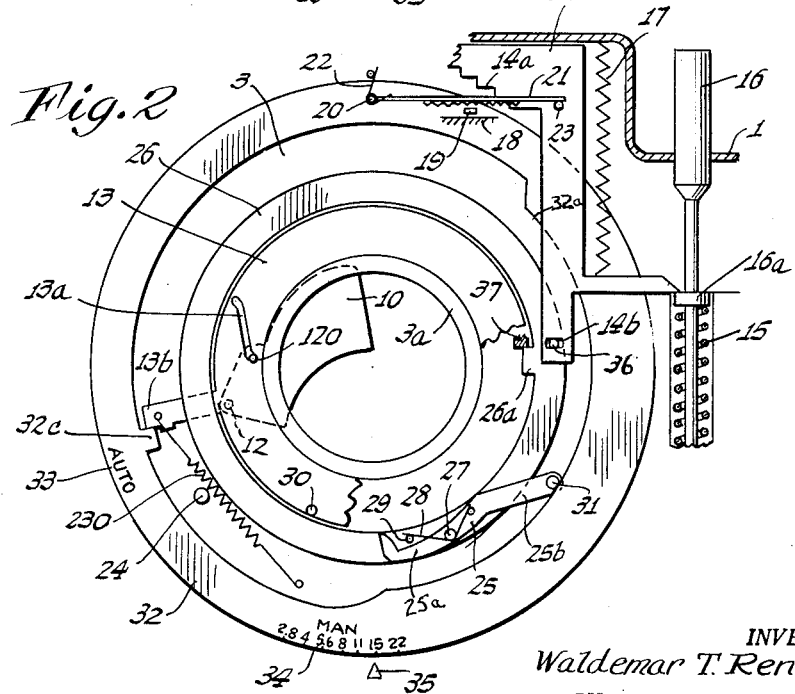

3,037,437
PHOTOGRAPHIC CAMERA HAVING AUTOMATIC EXPOSURE SETTING MEANS
Waldemar T. Rentschler, Calmbach (Enz), Germany, assignor to Alfred Gauthier, G.m.b.H., Calmbach (Enz), Germany, a corporation of Germany
Filed Apr. 24, 1961, Ser. No. 105,134
Claims priority, application Germany Apr. 28, 1960
3 Claims. (Cl. 95—10)

This invention relates to photographic cameras which have automatic exposure setting means wherein a sensing member is adjustably positioned in accordance with the adjusted position of a light-controlled member of a light intensity measuring device built into or attached to the camera, such positioning of the sensing member occuring as a consequence of actuation of the camera or shutter release member and being utilized to shift an exposure adjusting member which controls and exposure factor, as for example the camera diaphragm. The invention relates particularly to a camera of this type, wherein there is a manual control means comprising a selector device which is settable in "automatic" and "non-automatic" positions as well as a manually operable setting means for the said exposure factor.

An object of the invention is to provide a novel and improved automatic setting camera of the above type, wherein the automatic exposure regulating device can be rendered inoperative when exposures are to be made using a manual adjustment, in an uncomplicated, functionally dependable and economical manner, as well as independently of the indicating condition or operating state of the light intensity measuring device.

This is accomplished, in accordance with the invention, by the provision of a novel control and transmission organization which is associated with the exposure adjusting member, with the sensing member of the automatic exposure regulator, and with the manual control means (which comprises the selector device and the manually operable setting mean for effecting adjustment of the exposure factor). The said organization is characterized by a spring means which biases the exposure adjusting member to a starting position, in conjunction with a fixed stop for establishing said starting position, together with a connection or transmission means between the sensing and exposure adjusting members, the said driving connection or transmission means being characterized by a drive member and a cooperable abutment, the latter being provided on and carried by the exposure adjusting member.

The drive member shifts the exposure adjusting member against the action of the biasing spring thereof from the said starting position into an adjusted position which is determined by the setting of the movable light-controlled member of the measuring mechanism. The organization further includes a means which is responsive to moving the selector device to the "non-automatic" position, for shifting the said drive member out of the path of movement of the cooperable abutment to render inoperative the said driving connection or transmission between the sensing and exposure-adjusting members, in conjunction with means rendering operative another drive device associated with the manual adjusting means and the exposure adjusting member to effect adjustment of the latter in response to adjustable positioning of the manual setting means thereby to effect a manual control.

In a camera as provided by the invention, the automatic exposure regulating device is switched off or rendered in operative when exposures are to be made with a manual adjustment, by automatically effecting shifting of the drive member of the connection or transmission means out of the path of movement of the abutment which is provided on the exposure adjusting member, merely in response to the selector device being shifted to its "non-automatic" position, while at the same time the said other driving device associated with the manual setting member and the exposure adjusting member is automatically rendered operative by the same movement. This method of terminating the control influence of the automatic exposure regulating device where non-automatic exposures are to be had, results on the one hand in an optimally simple, space-saving and economical structure of the camera as provided by the invention, and on the other hand in a complete flexibility and freedom of choice in the construction and mode of operation of the exposure regulating mechanism. In addition to the above, a camera made in accordance with the invention is characterized by a particularly high degree of functional dependability owing to the above-described uncomplicated and straightforward, readily understood structure.

A readily adaptable or flexible organization of the above control means, which is completely adaptable to the respective requirements of various installations, is obtained when the movable drive member is carried on a separate transmission member which is drivingly connected to the sensing member and which can be shifted in the same directions as the exposure-adjusting member.

In addition, an especially advantageous construction as regards the use of relatively few components as well as the attainment of an operational simplicity and easily understood operation, is effected when the selector device is also constituted as the manually operable setting means for the exposure factor, and effected by providing an actuating member, as for example a cam, on such single member for effecting the shifting of the drive member to render the same inoperative, such cam and a component of the above-mentioned other drive device having a relative disposition on the single member so chosen as to effect shifting the drive member (to render inoperative the automatic exposure regulator and drive connection or transmission associated with such drive member) prior to the said other drive device becoming operative.

A embodiment of the invention is illustrated in the accompanying drawings, showing a camera of the type having an intra-lens shutter and an automatic exposure regulator.

FIG. 1 is a diagrammatic representation of the rear of a photographic intra-lens shutter carried by the camera. The said intra-lens shutter has a lamella or segment-type diaphragm, as well as control and transmission devices provided by the invention, for effecting both automatic and non-automatic setting of the diaphragm, which devices can be selectively rendered operative by positioning a selector device at "auto" (automatic) and "man" (non-automatic) positions. The selector is shown in the "auto" position.

FIG. 2 is a view similar to that of FIG. 1, but showing the selector device in the "man" position.

Figure 3:
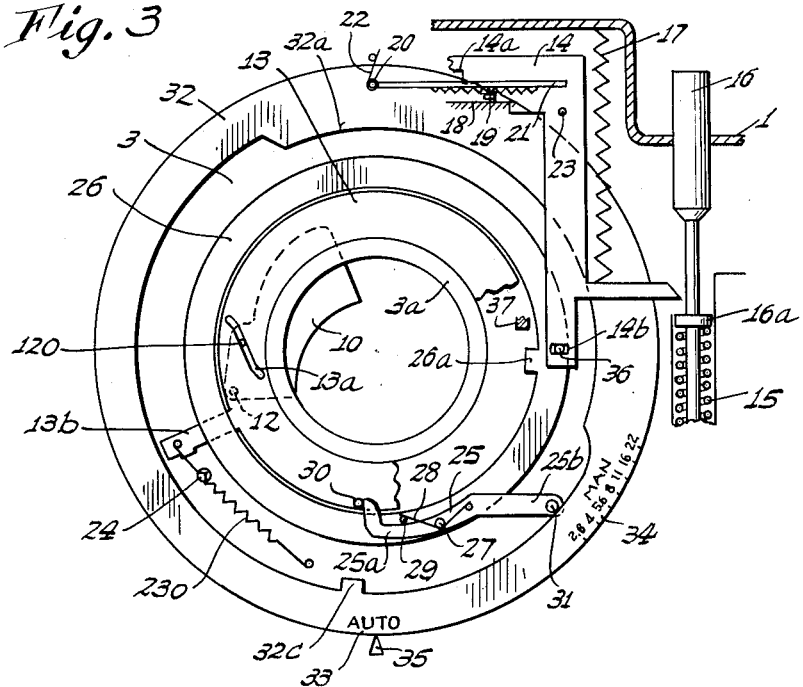
FIG. 3 is a view like those of FIGS. 1 and 2, but showing the camera release member depressed, with the selector set at the "automatic" position.
Figure 4:
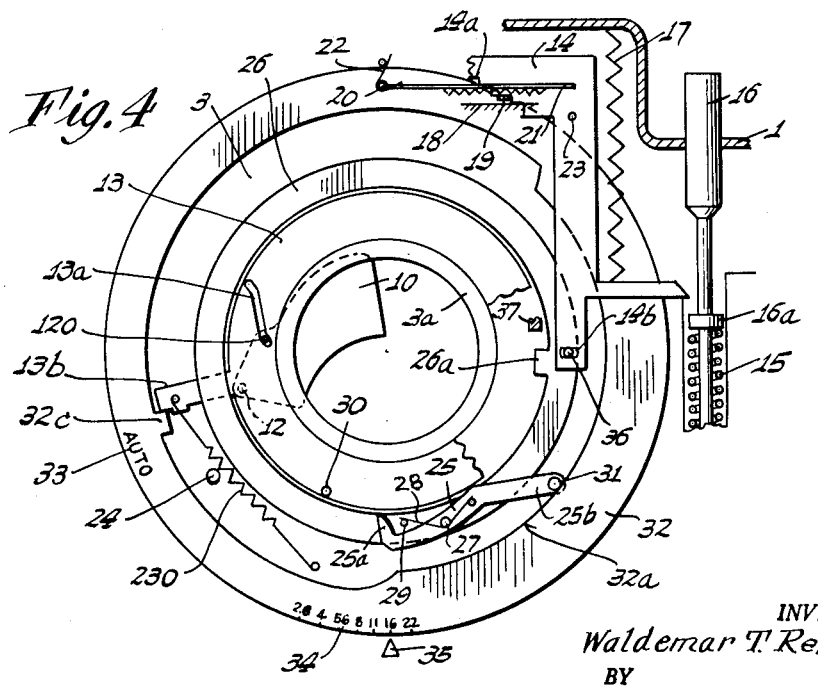
FIG. 4 is also a similar view, but showing the camera release member depressed with the selector set at the "man" position.

FIG. 5 is a top view of a camera embodying the invention, shown mostly in plan, with portions broken away to reveal interior details. In this figure, for the purpose of adjusting for different film sensitivities, and to take into consideration the shutter speed which is selected, there is shown a screening or shading device which cooperates with a photo-cell of the light-intensity measuring device and which is adjustable in response to movement of the setting devices for the exposure time and film sensitivity.

FIG. 6 is a fragmentary axial sectional view through the intra-lens shutter carried by the camera as seen in FIG. 5, illustrating the setting devices for exposure time (shutter speed) and film sensitivity, and also the selector device for effecting automatic and non-automatic adjustment of the diaphragm.

FIG. 7 is an exploded perspective view of portions of members of the setting devices for exposure time and film sensitivity, and of the selector device for obtaining automatic and non-automatic diaphragm settings.

Referring first to FIGS. 1–5, the housing or case of the photographic camera is indicated by the numeral 1. Affixed to the housing 1 at the front side thereof is a photographic intralens shutter designated generally by the numeral 2. The shutter is attached in a well known manner, by means of a tubular connection or nozzle 3a provided with external threads and disposed at the back of the shutter housing 3, such connection including a holding or clamping ring 4 which is in the form of a nut accommodated by the external screw threads (FIG. 6).

On the front of the shutter there is provided a distance or range setting ring 5, having a knurled periphery 5a and a range scale 6 (FIG. 5) which is cooperable with a fixed index mark 7.

Within the shutter housing 3 there is provided in a well known manner a base plate 8, which has a tubular bearing or bushing portion 8a for carrying well known members (not shown for reasons of clarity of illustration) of the shutter mechanism. At the back of the base plate 8 there is provided a driving ring 9 for the shutter blades, which latter are not shown for reasons of clarity. In addition, a clearance space 3b is provided at the rear of the base plate 8, to accommodate a diaphragm which is to be described later, such space being located at the inside of the rear wall of the shutter housing 3. The diaphragm comprises several lamellas or segments 10, only one of which is illustrated for the sake of clarity. The lamellas are positioned about pins 12 provided on a carrier plate 11, and are in addition having pin-and-slot connections 120, 13a with a rotatable exposure adjusting ring or member 13.

For the purpose of automatically setting or adjusting the diaphragm, a sensing member 14 is provided for cooperation with the diaphragm adjusting ring or member 13, such sensing member being under the control of the turnable coil 150 of an electric exposure meter or galvanometer instrument movement "M" which is built into the camera. The position of the coil 150 is sensed, in a well known manner, at the time that the camera release member 16 is actuated as seen in FIG. 5, such camera release member comprising a plunger which is shiftable in a direction perpendicular to the axis of the camera, being biased upward by a helical compression spring 15. The camera release member 16 cooperates in a well known manner with a shutter release mechanism (not shown for reasons of clarity) by means of which the (previously) cocked shutter is released for running down movement.

The sensing member 14, which is constructed in the form of a slide in the illustrated embodiment of the invention, is movable in a direction parallel to the axis of the plunger 16, and is acted on by a helical compression spring 17 which tends to maintain engagement between the member 14 and a collar 16a provided on the release plunger 16. The spring 17 is weaker than and overcome by the spring 15 which biases the release plunger 16, so that the sensing member 14 normally occupies the raised position shown in FIGS. 1 and 2 when the release plunger is not depressed. For the purpose of cooperating with the turnable coil 150 of the instrument movement M, the sensing member 14 has a stepped setting edge 14a adapted to engage under the action of the spring 17, when the plunger 16 is depressed, a needle 19 carried by the turnable coil 150. The needle 19 is movable over a base or supporting surface 18, against which it may be clamped thereby fixing the adjusted positions of the needle and sensing member. Prior to engagement by the sensing member 14, the needle is claimped against the base member 18 in a well known manner by means of a clamping device comprising a lever 21 which is pivotally mounted about an axis 20 and which is normally held disengaged from the needle 19 by a pin 23 carried by the sensing member 14 (see FIGS. 1 and 2). The clamp lever 21 is biased clockwise by a wire spring 22 as shown. For the positions of FIGS. 1 and 2, the clamping member is not engaged with the needle 19, and accordingly the latter is able to freely shift over the base member 18. However, when the plunger 16 is depressed, the lever 21 in being released by the pin 23 first engages the needle 19 with its ribbed or grooved underside, pressing the needle against the base member 18. This clamping process is completed prior to the sensing member effecting any adjustment of the diaphragm, by virtue of there being lost motion or an idle path "L" provided in the transmission between the sensing member and the diaphragm adjusting ring 13 (see FIG. 1).

For the purpose of carrying out exposures selectively using either the automatic mechanism or the non-automatic (manual) adjustment of the diaphragm, the camera or shutter has further a manual control means comprising a manually operable selector or switch member which is settable at "automatic" and "non-automatic" positions, together with a manually operable setting means for the diaphragm, both of the above being collectively referred to in the appended claims as a "manual control means." Details of this structure will be given below.

The cooperation or driving connection between the diaphragm adjusting member 13 on the one hand and either the sensing member 14 or else the manual setting means on the other hand is effected, in accordance with the invention, by a novel control and transmission mechanism. Included in such mechanism is a spring 230, which is connected to the diaphragm adjusting member 13 and tends to keep such member in a starting position (see FIGS. 1, 2) which is determined or established by a fixed stop pin 24 engageable with an arm 13b of the adjusting member. Further, a driver member is movably provided in the connection between the sensing member 14 and the diaphragm adjusting member 13, such driver member cooperating with an abutment provided on the diaphragm adjusting member, which in response to the sensing operation being effected, shifts the diaphragm adjusting member against the action of its spring 230 from the starting position as seen in FIG. 1 into a position which is determined by the setting of the turnable coil 150, M of the galvanometer. Further, for the purpose of eliminating the control influence of the sensing member 14 (rendering the sensing member inoperative to effect adjustment of the diaphragm), the movable driver member is shifted out of the path of movement of the cooperable abutment in response to shifting of the selector to the "non-automatic" position, and another drive device including a drive part carried by the manual setting member for effecting adjustment of the diaphragm adjusting member manually, is rendered operative.

The said (first-mentioned) movable drive member comprises, in the illustrated embodiment of the invention, a lever 25 which is pivotal about an axis 27 provided on a transmission ring 26 (to be described below). The drive member or lever 25 is engageable with a pin 29 on the transmission ring 26 to position the lever, being yieldably held in such engagement by a wire spring 28. One arm 25a of the lever 25 cooperates with a pin 30 constituting the above-mentioned abutment, which is affixed to the diaphragm adjusting ring 13, whereas the other arm 25b of the lever 25 has a cam follower pin 31 affixed thereto, which is cooperable with a cam 32a provided on the selector member or ring 32. The selector member or ring 32 is carried at the rear of the shutter housing 3 in a manner shown in FIG. 6, and comprises a cylindrical body 32d which surrounds the side wall of the shutter housing 3 and has a knurled periphery 32b to facilitate its being gripped and turned.

For the purpose of eliminating components and in order to enable the setting of the camera to be quickly effected in a clearly understood manner, the selector device is arranged so that it also serves as the manually operable setting means for the diaphragm, thus comprising a single, dual-function member. For this purpose, there is provided on such single member a setting mark 33 in the form of the word "auto," as well as a diaphragm adjusting scale 34 having associated with it the setting mark "man" (non-automatic). By virtue of such indicia the single operable member 32 can be properly positioned, considering the fixed index mark 35, to effect automatic or manual setting of the camera.

As is apparent from FIG. 6, the transmission ring 26 is disposed on the rear wall of the shutter housing 3 and has a pin-and-slot connection 14b, 36 with the sensing member 14. When the release member or plunger 16 is not depressed, the transmission ring engages, by means of a projection 26a provided thereon, a fixed stop 37 as seen in FIGS. 1 and 2.

The use of a transmission member such as the ring 26 to constitute a carrier for the movable drive member 25 provides a desirable flexibility and freedom of choice as regards the control and transmission structures. It especially enables the drive member and the selector device cooperating therewith to be located in the immediate vicinity of the exposure adjusting member, which results in short, effective connections between the drive member on the one hand and the exposure adjusting member and selector device on the other hand. In addition, such construction enables these members to be located in the same structural group or assemblage on the camera. If such structural group comprises an intra-lens shutter as in the illustrated embodiment of the invention, there is the additional advantage that it is possible to effect all setting and selecting operations in a simple and clear manner at the intra-lens shutter assemblage; further such assemblage can be constituted as a unit separate from the camera housing or case, being completely assembled and adjusted independently of the housing and camera so that there is only required a simple connection between the sensing member 14 controlled by the light intensity measuring device M and the transmission member (such as the ring 26) in order to enable setting and selecting operations to be carried out.

The setting movement of the diaphragm adjusting ring 13, considering exposures which are to be made with both modes, i.e., automatic regulation and non-automatic regulation or setting, takes place as follows: When the selector ring 32 is placed in the "automatic" position as shown in FIGS. 1 and 3, the lever 25 occupies the position indicated wherein the arm 25a is located in the path of movement of the abutment pin 30 provided on the diaphragm adjusting ring 26. This has the result that during the sensing movement of the sensing member 14, the diaphragm adjusting ring 13 is shifted against the action of the light spring 230 associated with it, from the starting position shown in FIG. 1 into an adjusted position as determined by the setting of the needle 19 of the measuring mechanism, as illustrated in FIG. 3.

However, where an exposure is to be effected utilizing a non-automatic or manual adjustment of the diaphragm, the selector and setting ring 32 is shifted to bring the diaphragm scale 34 adjacent the index mark 35, with the desired diaphragm aperture value at such mark. This pivots the drive member or lever 25 against the action of its spring 28 in a counterclockwise direction, in consequence of the cam 32a engaging and shifting the cam follower pin 31. Such action shifts the arm 25a of the drive member out of the path of movement of the abutment pin 30 affixed to the diaphragm adjusting ring 13.

The driving connection 25, 30 is now replaced with another driving device associated with the selector and setting ring 32 and with the diaphragm adjusting ring 13 whereby the latter may be manually adjustably positioned. The said other driving device comprises, in the illustrated embodiment of the invention, a drive part 32c which is carried by the selector and setting ring 32 and an arm 13b of the diaphragm adjusting ring 13. The drive part 32c is so arranged as to be in the path of movement of the arm 13b, as may be observed in FIG. 4. The arrangement of the members 32c and 13b is such that, upon the selector and setting ring 32 being shifted from the automatic position to the manual position, the movable drive member or lever 25 is rendered inoperative or shifted out of operative position prior to the other drive device 32c, 13b becoming operative.

In order to take into consideration different exposure times or shutter speeds and film sensitivities during the automatic setting of the diaphragm, a well-known device for changing the response of the light intensity measuring device M to the existing light conditions is provided on the camera.

Such change in the response of the light intensity measuring device M in response to different settings of the exposure time setting ring 38 and of the film sensitivity setting ring 39 is effected by screening or shading a photoelectric cell 42 which is connected as by wires 40 and 41 (FIG. 5) to the measuring mechanism M of the exposure meter. A honeycomb window 43 is provided in front of the photoelectric cell, in a well-known manner.

The screening or shading device comprises two cover members 46 and 47 which are arranged on opposite sides of the photocell and are pivotal about axes 44 and 45. Driving links 48 and 49 are pivotally connected to each of the cover members 46, 47. For the purpose of conjointly or simultaneously adjusting the levers 46 and 47, the two links 48 and 49 are pivotally connected to each other and have a common guide pin 50 extending into a bearing slot 1a provided in the housing 1 of the camera.

A cam connected to the setting rings 38 and 39 serves to adjust the above-described screening device in response to the adjustment of the setting rings, to take into consideration different exposure times and film sensitivities. The said cam is constituted on a carrier ring 51 which bears on the outer circumference of the side wall of the shutter housing 3 and has the reference numeral 51a (FIGS. 6 and 7). The carrier ring 51 is connected with the film sensitivity setting ring 39. For this purpose there is provided a coupling pin 52 which is affixed to the ring 39 and which is received in a slot 51b of the ring 51. The film sensitivity setting ring 39 in turn is connected to the exposure time setting ring 38 by means of a well-known releasable coupling device. The latter comprises a flexible leaf spring 53 which is arranged on the inner circumference of the ring 39 and which is cooperable with detent recesses 38a of the exposure time setting ring 38, having a projection 53a for this purpose. To actuate the leaf spring 53 there is provided a fingerpiece 54 at its free end, such fingerpiece passing through a clearance slot provided on the ring 39 so as to be accessible from the exterior of the intra-lens shutter assemblage. The mode of operation of the coupling device is such that when it is not depressed, the detent projection 53a is engaged with one of the detent recesses 38a whereby an adjustable movement of the exposure time setting ring 38 effects a simultaneous adjustment of the ring 39, and hence, of the cam ring 51. If, on the other hand, the detent projection 53a is disengaged from the detent recesses 38a as by depressing the fingerpiece 54, an adjustment of the ring 39 with respect to the ring 38 can be effected, for the purpose of setting for different film sensitivities. Arranged on the outer circumference of the exposure time setting ring 38, for the above purpose, is an exposure time scale 55 which may be referred to the abovementioned fixed index mark 7. The ring 38 also has a film sensitivity scale 56 which is cooperable with the mark 57 on the ring 39.

The arrangement of the setting rings 38 and 39 on the intra-lens shutter assemblage, as shown in FIG. 6, is such that the exposure time setting ring 38 is turnable in a well-known manner about the tubular bearing bushing 8a of the shutter base plate 8 being held against axial movement by a threaded ring 58 which is screwed on a thread 8b of the bushing. The bearing for the ring 39, on the other hand, is provided by the cylindrical jackets 32d, 38b which surround the side wall of the shutter housing 3 and which constitute portions of the selector ring 32 and of the exposure time setting ring 38 respectively.

Transmission of the displacement motion of the cam 51a (which is connected with the setting rings 38 and 39) to the screening cover members 46, 47 is effected by means of a transmission pin 59 which is movable in a direction parallel to the optical axis of the camera and has a bearing on the camera or in the shutter assemblage (in a manner not shown). One end of the transmission pin 59 engages the cam 51a under the action of the spring 60 which is connected between the two cover members 46 and 47, whereas the other end of the transmission pin 59 is engaged with a lever 62 pivotally movable about an axis 61 provided in the camera housing 1, such lever establishing the connection with the screening device by virtue of engagement with the common pin 50 thereof.

The above described camera functions and is operated in the following manner:

(a) Setting of the Exposure Time

For this purpose, the exposure time setting ring 38 is turned until the desired exposure time value on the scale 55 is opposite the fixed setting or index mark 7.

(b) Setting of the Film Sensitivity

This is done by first depressing the fingerpiece 54 and then adjusting the setting ring 39 (so as to release the coupling connection 53a, 38a) with respect to the exposure time setting ring 38 to bring the setting mark 57 opposite the sensitivity value of the film (which is being used) on the scale 56.

During both the setting for exposure time and film sensitivity, a change takes place in the shading or screening of the photoelectric cell, by means of the members 44 to 50 and 59 to 62. Accordingly, a change is effected in the adjusted position of the needle 19 of the measuring mechanism M corresponding to the adjustment for exposure time and film sensitivity.

(c) Effecting an Exposure Utilizing the Automatic Exposure Setting

As is apparent from FIG. 1, the selector and setting ring 32 is placed in the automatic position for this purpose. For this position, the cam 32a of the selector and adjusting ring 32 is disengaged from the cam follower pin 31 of the drive member 25 whereby the lever is no longer held in its inoperative position. Accordingly, under the influence of the spring 28, the lever now occupies the position shown in FIG. 1, wherein the arm 25a thereof is located in the path of movement of the pin 30 provided on the diaphragm adjusting ring 13. When the camera release plunger 16 is now depressed, releasing the sensing member 14 for downward movement as seen in FIG. 3, the member 14 and also the transmission ring 26 connected with it will follow such depressed movement to a certain extent under the action of the compression spring 17 acting on the sensing member. The measuring mechanism needle 19 is first clamped in its adjusted position by means of the clamping lever 21. Such clamping takes place within the idle movement "L" of the transmission ring 26 (as seen in FIG. 1). This idle movement "L" is shown as the distance between the arm 25a of the drive member 25 and the pin 30. After the measuring mechanism needle 19 has been clamped, the lever 25 impinges on the pin 30, whereby the diaphragm adjusting ring 13 is shifted against the action of its spring 230. The automatic setting of the diaphragm is terminated when one of the steps 14a of the sensing member 14 impinges on the measuring mechanism needle 19. Upon further depressing movement of the release plunger 16, the shutter is released and an exposure is effected, without further movement of the sensing member 14 or the diaphragm adjusting member 13.

(d) Effecting an Exposure With Manual Setting of the Diaphragm

This merely requires that the selector and setting member 32 be placed so that the desired diaphragm value on the scale 34 is opposite the index mark 35. Upon this being effected, the cam 32a of the selector ring comes into engagement with the pin 31 of the drive member 25, pivoting the latter in a counterclockwise direction so that the drive arm 25a moves out of the path of movement of the pin 30 of the diaphragm adjusting member 13. The driving device 25, 25a, 30 is now no longer effective to shift the diaphragm adjusting ring 13 but instead the other driving device 13b, 32c may become operative. This occurs in the following manner:

When the selector ring 32 is shifted to bring the desired diaphragm value of the scale 34 opposite the index mark 35 the projection or drive part 32c of the selector ring engages the arm 13b of the diaphragm setting ring for shifting the latter against the action of its spring 230 into an adjusted position to effect the desired diaphragm aperture.

In the foregoing description and specification, the invention is shown and described in connection with a photographic camera provided with an intra-lens shutter assemblage. In addition, however, the invention has utility and importance in cameras of every kind wherein, for the purpose of effecting an automatic exposure setting, the position of the movable member of a measuring mechanism is transmitted to an exposure adjusting member in response to actuation of the camera or shutter release member, and wherein a manually operable selector is positionable in "automatic" and "non-automatic" positions and a manual setting means is operative upon the selector being placed in the "non-automatic" position.

The device of the present invention has advantage for all cameras of this type, wherein the control influence of the automatic exposure regulating device can be discontinued when non-automatic exposures are to be effected, since it provides for such discontinuance in an optimally uncomplicated as well as a space-saving and economical manner while insuring complete flexibility and freedom of choice in the construction and mode of operation of the exposure regulating device.

I claim:

1. In a photographic camera of the type provided with an automatic setting means including a light intensity measuring device having a movable light-controlled member and a movable sensing member cooperable with the light-controlled member to be positioned thereby when the camera release is actuated, said camera having an exposure-adjusting member connected to and actuated by the sensing member, having manual control means comprising a selector device settable in "automatic" and "non-automatic" positions and manually-operable setting means for the exposure adjusting member operative for the "non-automatic" setting of the selector device, in combination, spring means biasing the exposure-adjusting member to a starting position; means including a fixed stop for establishing said starting position; a drive member and cooperable abutment arranged in the connection between the sensing and exposure-adjusting members, the latter member carrying said abutment and being shifted against the action of the spring means to an adjusted position by the sensing member, as determined by the position of said light-controlled member; a drive device for effecting adjustment of the exposure-adjusting member by the manually operable setting means; and means responsive to moving the selector device to "non-automatic" position, for shifting the drive member out of the path of movement of the abutment, to render inoperative the connection between the sensing and exposure-adjusting members and for rendering operative the said drive device whereby manual adjusting of the exposure-adjusting member may be effected.

2. A camera as in claim 1, in which there is a transmission member carrying the drive member and arranged in the connection between the sensing and exposure-adjusting members, said transmission member being movable in the same directions as the exposure-adjusting member.

3. A camera as in claim 1, in which the selector device and the setting means comprises a single manually engageable member, in which the means for shifting the drive member comprises a cam on the said single member, and in which the said drive device comprises a drive part on the single member, said cam and drive part having a relative disposition on the single member to shift the drive member and render inoperative the said connection prior to the drive device being rendered operative.

References Cited in the file of this patent

UNITED STATES PATENTS

| | | |
|---|---|---|
| 2,969,004 | Gebele | Jan. 24, 1961 |
| 2,974,578 | Wittel | Mar. 14, 1961 |
| 2,985,082 | Starp | May 23, 1961 |
| 2,988,977 | Rentschler | June 20, 1961 |
| 2,993,422 | Rentschler | July 25, 1961 |
| 2,996,968 | Lunzer | Aug. 22, 1961 |